(12) United States Patent
Cui et al.

(10) Patent No.: US 8,217,662 B2
(45) Date of Patent: Jul. 10, 2012

(54) TESTING DEVICE FOR USB I/O BOARD

(75) Inventors: Zhen-Shan Cui, Shenzhen (CN);
Lian-Zhong Gong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 946 days.

(21) Appl. No.: 12/198,587

(22) Filed: Aug. 26, 2008

(65) Prior Publication Data
US 2009/0249126 A1    Oct. 1, 2009

(30) Foreign Application Priority Data

Mar. 25, 2008  (CN) .......................... 2008 1 0300706

(51) Int. Cl.
*G01R 31/04*  (2006.01)
(52) U.S. Cl. ........................................ 324/538; 702/117
(58) Field of Classification Search .................. 324/537, 324/538

See application file for complete search history.

(56) References Cited

U.S. PATENT DOCUMENTS

| | | | | |
|---|---|---|---|---|
| 5,686,727 A * | 11/1997 | Reenstra et al. | .............. | 250/372 |
| 6,089,879 A * | 7/2000 | Babcock | .......................... | 439/79 |
| 6,570,748 B2 * | 5/2003 | Sanzo | .......................... | 361/93.1 |
| 6,792,378 B2 * | 9/2004 | Chen et al. | .................... | 702/119 |
| 6,807,504 B2 * | 10/2004 | Chen et al. | .................... | 702/118 |
| 7,121,873 B2 * | 10/2006 | Wu et al. | ........................ | 439/489 |
| 7,356,431 B2 * | 4/2008 | Hsu et al. | ...................... | 702/117 |
| 2007/0232132 A1 * | 10/2007 | Ling et al. | .................. | 439/541.5 |

* cited by examiner

*Primary Examiner* — Timothy J Dole
(74) *Attorney, Agent, or Firm* — Altis Law Group, Inc.

(57) ABSTRACT

A testing device for a USB I/O board includes USB plugs connected to the USB I/O board, a connector connected to the USB I/O board, an indication module, and a testing module including data output terminals connected to the USB plugs, data reception terminals connected to the connector, and indication terminals connected to the indication module. The testing module sends a testing signal to the USB I/O board via the data output terminals, and receives the testing signal from the USB I/O board via the data reception terminals. The testing module compares the testing signal to a threshold signal stored in the testing module. If the testing signal and the threshold signal are not substantially the same, the testing module generates an alarm signal to drive the indication module via the indication terminal. The indication module indicates the USB I/O board is abnormal.

6 Claims, 1 Drawing Sheet

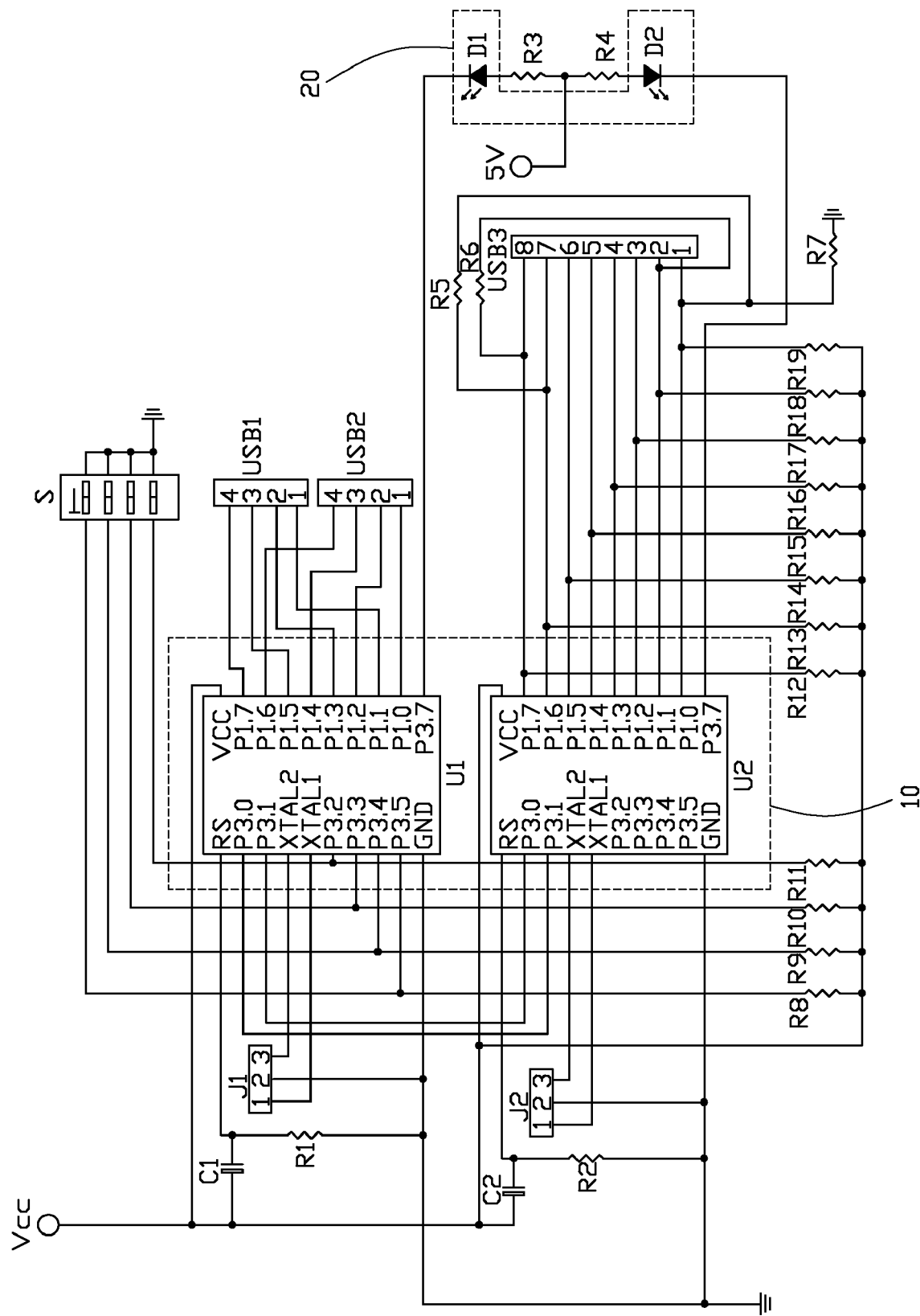

TESTING DEVICE FOR USB I/O BOARD

BACKGROUND

1. Field of the Invention

The present disclosure relates to a testing device for a universal serial bus (USB) input/output (I/O ) board.

2. Description of the Related Art

The performance of the USB I/O board is one of the major factors for the quality of data transmission between the motherboard and external devices. A typical motherboard includes USB electrical outlets and USB pins. A typical USB I/O board includes two USB electrical outlets capable of connecting to USB plugs, and an electrical plug capable of receiving the USB pins of the motherboard. The USB I/O board properly works only when its electrical plug and its USB electrical outlets are working properly. However, most testing devices for USB I/O boards are not efficient.

What is needed, therefore, is a testing device for a USB I/O board which can accurately test the performance of the USB I/O board.

BRIEF DESCRIPTION OF THE DRAWING

The drawing is a circuit diagram of an embodiment of a testing device for a USB I/O board.

DETAILED DESCRIPTION OF THE EMBODIMENTS

Referring to the drawing, an embodiment of a testing device for a USB I/O board includes two USB plugs USB1 and USB2, a connector USB3, a testing module 10, and an indication module 20. The testing module 10 includes two chips U1 and U2. The indication module 20 includes two light emitting diodes (LEDs) D1 and D2. The chips U1 and U2 each includes a power terminal VCC, a ground terminal GND, eight data terminals P1.0-P1.7, a reset terminal RS, two clock terminals XTAL1 and XTAL2, two cascade terminals P3.0 and P3.1, four setup terminals P3.2-P3.5, and an indication terminal P3.7. The USB plugs USB1 and USB2 are configured for connecting to two USB electrical outlets on the USB I/O board to be tested. The connector USB3 has eight pins, and is configured for connecting to a USB plug on the USB I/O board to be tested.

The power terminal VCC of the chip U1 is connected to a voltage source and the ground terminal GND of the chip U1 is grounded. The clock terminal XTAL1 of the chip U1 is connected to a first terminal 1 of a crystal oscillator J1 and the clock terminal XTAL2 of the chip U1 is connected to a third terminal 3 of the crystal oscillator J1. A second terminal 2 of the crystal oscillator J1 is grounded. The reset terminal RS of the chip U1 is connected to the voltage source through a capacitor C1 and is grounded through a resistor R1. The capacitor C1 and the resistor R1 form a reset circuit for the chip U1. The data terminal P1.0 of the chip U1 is connected to a terminal 1 of the USB plug USB2, the data terminal P1.2 of the chip U1 is connected to a terminal 2 of the USB plug USB2, the data terminal P1.4 of the chip U1 is connected to a terminal 3 of the USB plug USB2, and the data terminal P1.6 of the chip U1 is connected to terminal 4 of the USB plug USB2. The data terminal P1.1 of the chip U1 is connected to a terminal 1 of the USB plug USB1, the data terminal P1.3, of the chip U1 is connected to a terminal 2 of the USB plug USB1 the data terminal P1.5 of the chip U1 is connected to a terminal 3 of the USB plug USB1, and the data terminal P1.7 of the chip U1 is connected to terminal 4 of the USB plug USB1. The indication terminal P3.7 of the chip U1 is connected to a negative terminal of the LED D1. A positive terminal of the LED D1 is connected to the voltage source through a resistor R3.

The power terminal VCC of the chip U2 is connected to the voltage source and the ground terminal GND of the chip U2 is grounded. The clock terminals XTAL1 of the chip U2 is connected to a first terminal 1 of a crystal oscillator J2 and XTAL2 of the chip U2 is connected to a third terminal 3 of a crystal oscillator J2. A second terminal 2 of the crystal oscillator J2 is grounded. The reset terminal RS of the chip U2 is connected to the voltage source through a capacitor C2 and is grounded through a resistor R2. The data terminal P1.0 of the chip U2 is connected to the pin 1 of the connector USB3, the data terminal P2.0 of the chip U2 is connected to the pin 2 of the connector USB3, the data terminal P3.0 of the chip U2 is connected to the pin 3 of the connector USB3, the data terminal P4.0 of the chip U2 is connected to the pin 4 of the connector USB3, the data terminal P5.0 of the chip U2 is connected to the pin 5 of the connector USB3, the data terminal P6.0 of the chip U2 is connected to the pin 6 of the connector USB3, the data terminal P7.0 of the chip U2 is connected to the pin 7 of the connector USB3, and the data terminal P8.0 of the chip U2 is connected to the pin 8 of the connector USB3. The indication terminal P3.7 of the chip U2 is connected to a negative terminal of the LED D2. A positive terminal of the LED D2 is connected to the voltage source through a resistor R4.

The resistors R3 and R4 are configured for protecting the LEDs D1 and D2 by reducing the current. The cascade terminals P3.0 of chip U1 is connected to the cascade terminal P3.1 of chip U2, and the cascade terminal P3.1 of the chip U1 is connected to the cascade terminal P3.0 of the chip U2. The setup terminals P3.2, P3.3, P3.4, and P3.5 of the chip U1 are grounded through a four-way switch S. In one embodiment, the testing module 10 comprising the chips U1 and U2 is a cascade-type chip module. In another embodiment, the testing module 10 may be other types of chip modules, such as a signal chip module.

The pin 1 of the connector USB3 is connected to the pin 7 of the connector USB3 via a resistor R5, the pin 2 of the connector USB3 is connected to the pin 8 of the connector USB3 via a resistor R6, and the pin 1 of the connector USB3 is further grounded through a resistor R7. The setup terminal P3.5 of the chip U1 is connected to the voltage source through a resistor R8, the setup terminal P3.4 of the chip U1 is connected to the voltage source through a resistor R9, the setup terminal P3.3 of the chip U1 is connected to the voltage source through a resistor R10, and the setup terminal P3.2 of the chip U1 is connected to the voltage source through a resistor R11. The data terminal P1.7 of the chip U2 is connected to the voltage source through a resistor R12, the data terminal P1.6 of the chip U2 is connected to the voltage source through a resistor R13, the data terminal P1.5 of the chip U2 is connected to the voltage source through a resistor R14, the data terminal P1.4 of the chip U2 is connected to the voltage source through a resistor R15, the data terminal P1.3 of the chip U2 is connected to the voltage source through a resistor R16, the data terminal P1.2 of the chip U2 is connected to the voltage source through a resistor R17, the data terminal P1.1 of the chip U2 is connected to the voltage source through a resistor R18, and the data terminal P1.0 of the chip U2 is connected to the voltage source through a resistor R19.

When the testing device for the USB I/O board enters a working status, the indication terminals P3.7 of the chips U1 and U2 output low level signals, and the LEDs D1 and D2 emit light. The chip U1 sends a testing signal to the USB I/O board to be tested via the data terminals P1.0 through P1.7. The chip U2 receives the testing signal from the USB I/O board to be tested via the data terminals P1.0 through P1.7 and compares the testing signal to a threshold signal stored in the chip U2. If the testing signal and the threshold signal are substantially the same, the indication terminal P3.7 of the chip U2 maintains its current state. If the testing signal and the threshold signal are not substantially the same, the indication terminal P3.7 of the chip U2 outputs a high level signal to turn off the LED D2. The high level signal has a greater voltage than the low level signals. In one embodiment, the data terminals P1.0 to P1.7 of the chip U1 act as output terminals of the testing module 10, and the data terminals P1.0 to P1.7 of the chip U2 act as input terminals of the testing module 10. Similarly, if the chip U2 sends the testing signal to the USB I/O board to be tested via the data terminals P1.0-P1.7, the chip U1 will receive the testing signal from the USB I/O board to be tested, and compare the testing signal with the threshold signal. The chips U1 and U2 may store a plurality of predetermined values. Any one of the predetermined values can be set as the threshold signal via the switch S to satisfy the demand for testing various USB I/O boards.

In other embodiments, switches may be located between the voltage source and the power terminal VCC of the chip U1, or between the power terminals VCC of U2 and the power terminal VCC of the chip U2 to control the working status of the chips U1 and U2. The indication terminal P3.7 of the chip U1 may be connected to the positive terminal of the LED D1, the indication terminal P3.7 of the chip U2 may be connected to the positive terminal of the LED D2, and the negative terminals of the LEDs D1 and D2 are grounded. If the testing signal and the threshold signal are not substantially the same, the indication terminal of the chip U2 sends a high level signal and the LEDs D1 and D2 emit light to indicate that the USB I/O board is faulty. In one embodiment, the LEDs D1 and D2 may also indicate if the testing is finished. It may be appreciated that the number of the USB plugs may be adjusted according to the number of the USB electrical outlets on various USB I/O boards.

The foregoing description of the embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A testing device for a universal serial bus (USB) input/output (I/O) board, comprising:
    two USB plugs configured for connecting to the USB I/O board;
    a connector comprising eight pins and connected to the USB I/O board;
    an indication module configured for indicating if the USB I/O board is abnormal; and
    a testing module comprising:
        a plurality of data output terminals connected to the two USB plugs;
        a plurality of data reception terminals connected to the connector; and
        at least one indication terminal connected to the indication module;
    wherein the testing module is configured for sending a testing signal via the plurality of data output terminals to the USB I/O board; the testing module is further configured for receiving the testing signal from the USB I/O board via the data reception terminals and comparing the testing signal from the USB I/O board to a threshold signal stored in the testing module; upon a condition that the testing signal from the USB I/O board and the threshold signal are not substantially the same, the testing module is further configured for generating an alarm signal to drive the indication module via the at least one indication terminal; the testing module further comprises a first chip and a second chip; the threshold signal is stored in the first chip and the second chip; the first chip and the second chip each comprises a power terminal, a ground terminal, eight data terminals, two cascade terminals, and an indication terminal; the eight data terminals of the first chip are configured for acting as the plurality of data output terminals and are connected to the two USB plugs; the eight data terminals of the second chip are configured for acting as the plurality of data reception terminals and are connected to the eight pins; the cascade terminals of the first chip and the second chip are connected to each other; the power terminals of the first chip and the second chip are connected to a voltage source; the ground terminals of the first chip and the second chip are grounded; the indication terminals of the first chip and the second chip are connected to the indication module.

2. The testing device of claim 1, wherein the indication module comprises a first LED and a second LED; a negative terminal of the first LED is connected to the indication terminal of the first chip, and a positive terminal of the first LED is connected to the voltage source; a negative terminal of the second LED is connected to the indication terminal of the second chip, and a positive terminal of the second LED is connected to the voltage source.

3. The testing device of claim 2, wherein a default voltage of the indication terminals of the first and second chips are a first value; voltages of the indication terminals of the first and second chips increase beyond the first value upon the condition that the testing signal and the threshold signal are not substantially the same.

4. The testing device of claim 3, further comprising a multi-way switch, wherein the first and second chips store a plurality of predetermined values for comparing to the testing signal; the first chip further comprises a plurality of setup terminals connected to the multi-way switch; the multi-way switch is configured for setting one of the plurality of predetermined values as the threshold signal.

5. The testing device of claim 1, further comprising a first switch and a second switch, wherein the power terminal of the first chip is connected to the voltage source via the first switch, and the power terminal of the second chip is connected to the voltage source via the second switch.

6. The testing device of claim 1, wherein the indication module comprises a first LED and a second LED; a positive terminal of the first LED is connected to the indication terminal of the first chip, and a negative terminal of the first LED is grounded; a positive terminal of the second LED is connected to the indication terminal of the second chip, and a negative terminal of the second LED is grounded.

* * * * *